US008838151B2

(12) United States Patent
Tarlow et al.

(10) Patent No.: US 8,838,151 B2
(45) Date of Patent: Sep. 16, 2014

(54) METHOD AND APPARATUS FOR POSITIONING USING QUASI-FINGERPRINTING

(75) Inventors: Ben Tarlow, Cottenham (GB); Murray Jarvis, Stapleford (GB)

(73) Assignee: Cambridge Silicon Radio Limited, Cambridge (GB)

( * ) Notice: Subject to any disclaimer, the term of this patent is extended or adjusted under 35 U.S.C. 154(b) by 126 days.

(21) Appl. No.: 13/436,795

(22) Filed: Mar. 30, 2012

(65) Prior Publication Data

US 2013/0260799 A1 Oct. 3, 2013

(51) Int. Cl.
*H04W 24/00* (2009.01)
*H04B 17/00* (2006.01)

(52) U.S. Cl.
USPC .................................... 455/456.5; 455/67.11

(58) Field of Classification Search
None
See application file for complete search history.

(56) References Cited

U.S. PATENT DOCUMENTS

| | | | |
|---|---|---|---|
| 6,263,208 B1 | 7/2001 | Chang | |
| 7,630,943 B2* | 12/2009 | Nerguizian et al. | 706/20 |
| 2005/0285792 A1 | 12/2005 | Sugar | |
| 2011/0304503 A1 | 12/2011 | Chintalapudi et al. | |

FOREIGN PATENT DOCUMENTS

| | | |
|---|---|---|
| DE | 10142953 | 4/2003 |
| EP | 1302783 | 4/2003 |
| EP | 2492707 | 8/2012 |
| WO | WO2012/038779 | 3/2012 |
| WO | WO2013/041889 | 3/2013 |

OTHER PUBLICATIONS

Hatami, A. et al., "A Comparative Performance Evaluation of RSS-Based Positioning Algorithms Used in WLAN Networks", IEEE Communications Society / WCNC 2005, pp. 2331-2337.
Erceg, V., et al., "TGn Channel Models", IEEE 802,11-03/940r4, May 2004, pp. 1-45.
Search Report issued Aug. 23, 2013 in corresponding GB1303512.6.

* cited by examiner

*Primary Examiner* — Erika A Washington
(74) *Attorney, Agent, or Firm* — Pillsbury Winthrop Shaw Pittman LLP

(57) ABSTRACT

According to certain aspects, the invention provides a method of achieving near-fingerprinting accuracy without fingerprinting database costs, via parametric representation of training data. In embodiments, this is achieved by using a parametric representation for the training data and limiting the region of applicability of the parametric model in order to mimic fingerprinting. According to certain additional aspects, an algorithm according to principles of the invention includes two separate parts, training and positioning. Training encompasses the derivation of the parametric model and region of applicability. This comprises access point position, propagation model and the window of applicability. Positioning covers the use of the derived model along with a set of fresh observations to generate a position estimate.

18 Claims, 8 Drawing Sheets

METHOD AND APPARATUS FOR POSITIONING USING QUASI-FINGERPRINTING

FIELD OF THE INVENTION

The present invention relates generally to positioning, and more particularly to methods and apparatuses for determining the position of a device using received signal strengths from a plurality of transmitters.

BACKGROUND OF THE INVENTION

RSSI fingerprinting and weighted centroid calculation/trilateration are well-known techniques for Wi-Fi positioning. In RSSI fingerprinting, the set of observed access points and their respective measured RSSI values is associated with a particular position. This is done, by means of a survey, for a number of positions and the set of access points and RSSI values is referred to as a fingerprint. When it comes to positioning a device, the set of measured access points and their RSSI values is compared with those previously surveyed fingerprints and the final position estimate is based on the positions of the most closely matching fingerprints. In weighted centroid positioning, estimates of access point locations are averaged to yield a position estimate for the user. The calculation is likely to be a weighted average, based on the estimated signal path loss from each of the access points. According to some respects, these well-known positioning techniques represent the two extremes of the trade-off between database size and accuracy. More particularly RSSI fingerprinting is very accurate, but requires a large database to implement. Weighted centroid positioning uses much less memory to implement, but is not very accurate. Accordingly, a need remains in the art for improved Wi-Fi positioning techniques.

SUMMARY OF THE INVENTION

According to certain aspects, the invention provides a method of achieving nearly the same wireless device positioning accuracy as fingerprinting with reduced database costs, via parametric representation of training data. In embodiments, this is achieved by using a parametric representation for the training data and limiting the region of applicability of the parametric model in order to mimic fingerprinting. According to certain additional aspects, an algorithm according to principles of the invention includes two separate parts, training and positioning. Training encompasses the derivation of the parametric model and region of applicability. This comprises access point position, propagation model and the window of applicability. Positioning covers the use of the derived model along with a set of fresh observations to generate a position estimate.

In furtherance of these and other aspects, a method according to embodiments of the invention includes receiving measurement data for a wireless transmitter at a server; and producing, by the server, a quasi-fingerprint of the wireless transmitter using the received measurement data, the quasi-fingerprint comprising a parametric representation that models received signal strength within a window of applicability.

In additional furtherance of these and other aspects, a method according to embodiments of the invention includes identifying a received signal from the wireless transmitter at a client device; receiving a quasi-fingerprint of the wireless transmitter, the quasi-fingerprint comprising a parametric representation that models received signal strength within a window of applicability; and computing an estimated position of the client device using the quasi-fingerprint.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
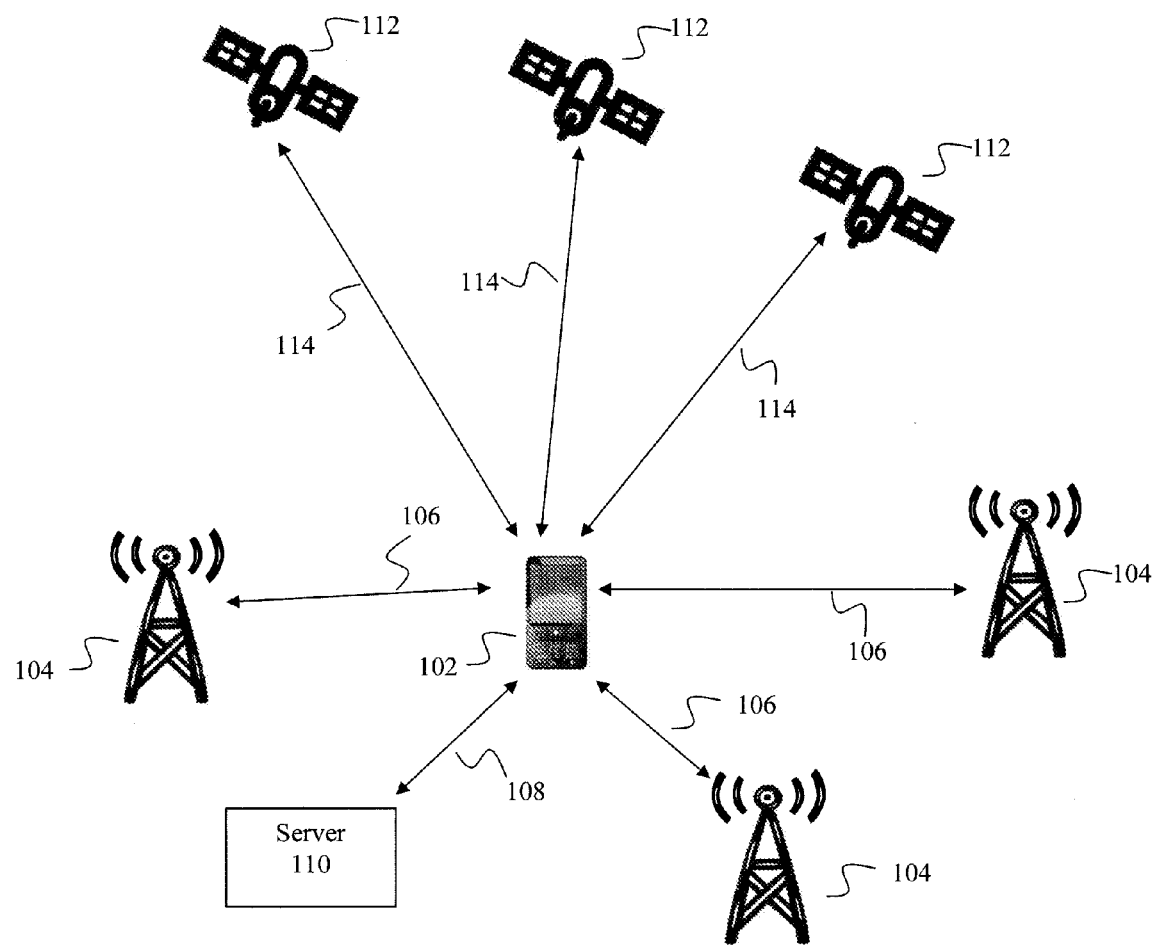
FIG. 1 is a diagram illustrating example aspects of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the invention provides a method of achieving nearly the same Wi-Fi positioning accuracy as fingerprinting without the typical high costs of fingerprinting databases, via parametric representation of training data. In embodiments, this is achieved by using a parametric representation for the training data and limiting the region of applicability of the parametric model in order to mimic fingerprinting.

According to certain additional aspects, an algorithm according to principles of the invention includes two separate parts, training and positioning. Training encompasses the derivation of the parametric model and region of applicability. This comprises determining access point position, a propagation model and the window of applicability from measurement data. Positioning covers the use of the derived model along with a set of fresh observations and the window of applicability to generate a position estimate.

According to still further aspects, a Wi-Fi positioning method according to principles of the invention takes a different approach from that of conventional methods. RSSI fingerprinting and weighted centroid calculation/trilateration are well-known techniques for Wi-Fi positioning, and they represent the two extremes of the trade-off between database size and accuracy. An approach described herein embodies a different technique, requiring a similar size of database to that of centroid positioning but with better accuracy closer to that of fingerprinting. This method is sometimes referred to herein as quasi-fingerprinting or QFP.

According to still further aspects, the present inventors recognize that database size is particularly important when positioning is done in a client device because when a position needs to be calculated by the client such as in a RSSI fingerprinting scheme, the data relevant to the locale of the user needs to be identified by a server and sent to the device. It is beneficial instead to have the relevant local data on the device as this provides a much more responsive user experience and reduces overall data transfer. However, this would require a large database in the client, which is impractical and/or expensive. Accordingly, most current fingerprinting systems retain all the data on a server and further do the position computation on the server to avoid the data transfer problem.

A block diagram illustrating an example application of principles of the invention is provided in FIG. 1. As shown in FIG. 1, a mobile device 102 is in signal communication with one or more access points 104 via signal paths 106. These access points 104 can be Wi-Fi access points, and signal paths 106 can be wireless signals in accordance with IEEE 802.11, for example. It should be noted that such communications need not be bi-directional for all access points 104. Rather, device 102 may only receive signals from certain or all of access points 104. It should be further noted that wireless signals in paths 106 can additionally or alternatively include GSM/3G/4G signals and access points 104 can be base stations in a cellular phone system. Likewise, signals in paths 106 can additionally or alternatively include Bluetooth signals and access points 104 can be Bluetooth devices. For ease of illustration, however, the descriptions herein will focus on example implementations using Wi-Fi systems, and those skilled in the art will appreciate how to extend these example implementations to using other systems such as cellular systems after being taught by these examples.

In embodiments such as that shown in FIG. 1, mobile device 102 can also receive signals from one or more GNSS satellites 112 via signal paths 114 which can be GPS signals, for example. As shown in this example, mobile device 102 is also in communication with server 110 via signal path 108. Server 110 can be an assisted positioning server associated with a wireless carrier, such as an assisted GPS server, in which case signal path 108 may include cellular signals. However, many alternatives are possible, such as a dedicated server in one or more locations for providing Wi-Fi position assistance. In this case, signal path 108 may comprise Wi-Fi signals. Those skilled in the art will understand how to implement server 110 using the appropriate transceivers, computing devices and associated software after being taught by the present disclosure.

Mobile device 102 is typically any cellular or similar type of telephone (e.g. iPhone, Blackberry, Android smartphone, etc.) with built-in Wi-Fi, Bluetooth and/or GPS functionality. However, many alternatives are possible such as portable or tablet computers (e.g. iPad, Galaxy, etc.), personal navigation devices, etc. Wi-Fi transceiver functionality in mobile device 102 can be implemented using any combination of hardware and/or software, including Wi-Fi chipsets and associated firmware/software from CSR Ltd., Marvell, or Qualcomm, possibly as adapted and/or supplemented with functionality in accordance with the present invention, as described in more detail herein. GPS receiver functionality in mobile device 102 can be implemented using any combination of hardware and/or software, including GPS chipsets and associated firmware/software such as SiRFstarII, SiRFstar IV or SiRFstar V from CSR Ltd. or BCM4750 from Broadcom Corp., possibly as adapted and/or supplemented with functionality in accordance with the present invention, and described in more detail herein. More particularly, those skilled in the art will be able to understand how to implement the present invention by adapting and/or supplementing such Wi-Fi and/or GPS chipsets and associated software or firmware with the positioning techniques of the present invention after being taught by the present specification.

In addition to the Wi-Fi and/or GPS functionality incorporated in device 102 as described above, device 102 may additionally or alternatively incorporate other wireless and/or positioning functionality. For example, device 102 can include Bluetooth transceiver functionality implemented by chipsets and associated firmware/software from CSR Ltd. Moreover, device 102 can include dead reckoning functionality implemented using sensor devices such as accelerometers, gyroscopes, compasses, etc. and associated firmware/software for projecting an estimated position based on a known position and sensor outputs.

As described herein, mobile device 102 and server 110 are configured in a server/client relationship. Accordingly, it should be appreciated that mobile device 102 preferably includes client software to interact with server 110 using known and/or proprietary protocols. Further details thereof will be omitted here for clarity of the present invention.

In general, server 110 maintains information for each access point 104. During training, the invention uses estimated locations (i.e. anchors) of device 102 along with corresponding received signal strength values (e.g. received signal code power (RSCP) and/or received signal strength indicator (RSSI) values) from access points 104, to produce a position estimate and a propagation model for each maintained access point 104, along with a window of applicability for which its data is valid. The window preferably encapsulates all positions at which the access point was seen amongst the training data samples. The estimated locations used during training can be derived from GNSS signals, dead reckoning from previously known positions, user inputs, etc.

During positioning, when estimating a user position having device 102 (and possibly with no visible satellites), the invention finds the minimum value of a cost function, applying a high cost to positions that fall outside the window of applicability for each access point 104 visible to the device 102, and matching the reported signal strength values (e.g. RSCP and/or RSSI) from the device 102 to that of a signal strength value predicted using the estimated propagation model. It should be noted that the access point position is not necessarily used directly for positioning as it would be in a weighted centroid approach, but is used to recreate reference signal strength values within its window of applicability.

Server 110 can be implemented by any conventional server computer having one or more processors, program and data memory and associated storage. Those skilled in the art will understand how to implement a server 110 with the QFP functionality of the invention after being taught by the following examples.

The following describes one example embodiment of a training method according to the invention, broken down into individual steps.

Figure 2:
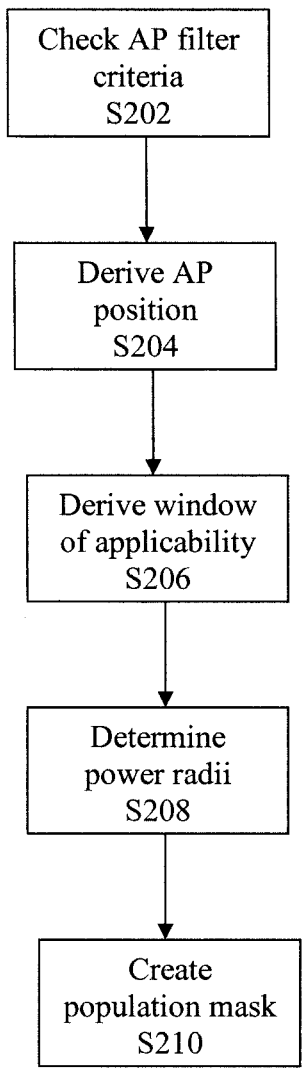
FIG. 2 is a flowchart illustrating an example training phase according to embodiments of the invention.

As shown in FIG. 2, in embodiments of the invention, instead of using all observations from all reports received from devices 102 during training, the results are filtered in step S202 so as to produce QFPs only for APs meeting certain criteria. This selection process preferably starts when the server has received a number of reports from possibly different devices 102. In embodiments, filtering in step S202 includes several checks that are performed in order for a QFP to be produced from a given AP. First, the neighbourhood of the access point is checked to see whether it contains a sufficient density of other APs. For example and without limitation, a "neighbourhood" is within 100 m and a sufficient density is at least 50 AP's within the neighbourhood. If this test is passed, QFP computation for a given AP 104 begins by retrieving a list of observations (e.g. signal strength values and anchors) associated with the AP, and the AP centroid most recently computed. The anchor for an observation includes, for example, a position (e.g. latitude/longitude/altitude or local grid coordinates) along with possibly a velocity and confidence value. Next, the server further checks that there are enough observations whose anchor confidence is good enough. For example, and without limitation, sufficient confidence is established if the $50^{th}$ percentile of the distances between the anchor positions in the observations and the centroid lies within 10 meters. Next, the server 110 checks to make sure that the distance between the listed anchor for the observation and the last calculated centroid is within a maximum distance threshold (e.g. 500 meters). Finally, if the size of the list of observations passing all the above tests is greater than a minimum threshold (e.g. 20 or more), then QFP can be computed for this AP, otherwise it cannot.

In step S204, the server derives the access point position. A TGN signal propagation model (e.g. Erceg V., et al., "TGn Channel Models," IEEE 802.11 document 03/940r4, May 2004) is assumed and the parameters of this model are used to fit to the training data. The output is a pair of parameters describing the TGN model and a nominal position for the AP transmitter. The TGN model parameters are not used hereafter.

In step S206, independently of finding the AP position as described above, an applicability window for the AP is also derived. In embodiments, this is a rectangle that encompasses tightly the positions of the training data points. When used for positioning, points within the rectangle incur a lower contribution to the positioning cost function than those outside the rectangle.

Next in step S208, given the transmitter position derived as described above, contour lines corresponding to the RSSI "wavefronts" at, for example, −50 dBm, −60 dBm, −70 dBm, −80 dBm, −90 dBm and −100 dBm, are generated by fitting to the training data.

Finally, in step S210, server 110 generates, for each window about an AP 104, a mask indicating what areas of the window are (heavily) populated in the training data. In embodiments, this mask is a regular 4×4 division of the window where each of the 16 cells contains a 0 (populated) or a 1 (not populated). A 1 indicates that a higher cost should be applied by the positioning cost function within that cell.

Further example implementation details for a training method in accordance with embodiments of the invention such as that described above in connection with FIG. 2 will now be provided.

As mentioned above, during training, server 110 derives a different QFP model for each AP 104. Each AP 104 can be uniquely identified by its broadcast identifier such as the 48-bit BSSID. First, as discussed above in connection with step S202 of FIG. 2, all harvested data is collected for which there is a ground truth position and an RSSI measurement of the AP under consideration. In one example embodiment, the result of deriving the model in steps S204 to S210 for each AP will be a structure containing the following: AP nominal position; power contours (or radii); applicability window; size of training sample; and population mask. These parameters are all described in more detail below.

In embodiments, finding AP position and associated power radii in steps S204 and S208 is a two-stage process. First, a conjugate gradient method for function minimization is used to solve for an access point position and an associated TGN model, which is specified by two parameters. This ensures that the propagation model is fairly sensible and is a safeguard against over-fitting the model to the training data. Second, the calculated access point position and training samples are used to fit a set of power radii associated with the AP. For example, six radii corresponding to power levels at which the received power is −50 dBm, −60 dBm, −70 dBm, −80 dBm, −90 dBm and −100 dBm are derived. It should be noted that RSSI is used as the signal strength value in the following examples. However, the signal strength can be RSCP or other equivalent or similar values.

In the first stage, determining the AP position (e.g. as in step S204), a propagation model function such as $f(d):=n_1-n_2 \log_{10}(d)$, where $n_1$ and $n_2$ are constants is used to convert distances to expected received signal strength (e.g. RSSI) values, assuming a transmit power of −40 dBm where it is unknown. In embodiments, a Polak-Ribiere conjugate gradient minimizer is then used to find a position that minimizes a cost function, whose cost at a point p is as follows:

$$\text{Cost} = (\Sigma \alpha_i |RSSI_i - f(\oplus p_i - p|))/(|RSSI_i|^k)$$

where $|p_1-p|$ is the absolute distance between position values $p_i$ and p. In embodiments where two-dimensional position coordinates (x,y) are used, $|p_i-p|=SQRT((x_{pi}^2-x_p^2)+(y_{pi}^2-y_p^2))$. In certain embodiments where three-dimensional position coordinates (x,y,z) are used, $|p_i-p|=SQRT((x_{pi}^2-x_p^2)(y_{pi}^2-y_p^2)+\text{zeta}*(z_{pi}^2-z_p^2))$, where zeta (e.g. 5) is a constant reflecting the additional signal attenuation in the vertical direction for a local environment.

The sum above is performed over all training data measurement sets i containing a position $p_i$ and a signal strength value $RSSI_i$. For example, the server 110 collects measurement reports associated with each AP 104 from all devices 102 that receive signals 106 from APs 104. The devices 102 include conventional hardware and/or software that determine the signal strength (e.g. RSCP or RSSI) of the received signals 106. The devices 102 also include GNSS or other positioning functionality (e.g. dead reckoning or user inputs) to determine a location associated with device 102 at the time the signals 106 are received, which can be two or three-dimensional position depending on the type of functionality. These locations and signal strength values can be periodically sent by device 102 using client software to server 110 for each AP 104 from which it receives signals. Accordingly, the measurement reports used by server 110 can include multiple reports from a single device 102, as well as multiple reports from multiple devices 102.

The parameter $\alpha_i$ allows observed power levels to be weaker than the predicted value more easily than they can be stronger. In embodiments, $\alpha_i:=1$ if $RSSI_{meas} \leq RSSI_{pred}$ and $\alpha_i:=2$ if $RSSI_{meas} > RSSI_{pred}$. This parameter is determined from each measurement set i where $RSSI_{meas}$ is the $RSSI_i$ value and $RSSI_{pred}$ is calculated by determining the distance between $p_i$ and p and determining the expected RSSI value based on that distance. For example, $RSSI_{pred}$ is determined using the current values of n1 and n2 in the model.

A value of k=2 is used in some embodiments. Since this function forms the basis for calculating cost when performing positioning, it may be advantageous to use the same value of k used there.

The minimizing function derives values for $n_1$, $n_2$ and p for each access point. The values of $n_1$ and $n_2$ can be discarded. The value of p is denoted as the nominal (i.e. model) position.

Given the model access point position p resulting from the above minimization, and the original training samples, the next step (e.g. as in step S208) is to estimate the radii at which the access point's transmit power has respectively fallen to bands of −50 dBm, −60 dBm, −70 dBm, −80 dBm, −90 dBm and −100 dBm. In embodiments, first, for each band, the process determines which of the total training samples for an AP that fall within 5 dB of the band. For all such samples, the distances (i.e. $|p-p_i|$) from the estimated access point position p are then computed and the median of these computed values is used as the radius. After all the radii are computed, a further check can be performed on the radii to ensure that the values form a monotonic sequence. Also, the calculation may not be performed at all if the number of training samples within the power range is too small (e.g. less than 10 samples). In these cases a modified or simplified TGN model may be used to provide a default distance associated with that band. If this creates a non-monotonic sequence, the value of the radius related to the higher power of any decreasing, neighbouring pair of radii can be used, and the second value is set to be larger than the first by a small distance (e.g. 1 m in some embodiments).

The window of applicability (e.g. as calculated in step S206) is intended to be the area for which the derived access point position and propagation model are valid, and so it is an approximation to the area covered by the training data samples for which the access point was seen. Embodiments of the invention described in more detail herein use rectangles as the windows of applicability, though other shapes (convex hull, ellipse, union of disconnected shapes) may also be used to provide an approximation. In some respects, rectangles are preferred because they are easy to derive and manipulate; it is straightforward to check for membership of a point within its area; and they require only a small amount of extra memory per access point to store. A preferred property of the representation is that it does not permit the positioning phase to extrapolate the parametric model much beyond the range of the training data from which is was derived. Bearing this in mind, and given the smooth nature of the parametric models, it is not necessary to be too sensitive to the exact shape of the region of applicability.

In embodiments where a rectangle is used, the covariance matrix for the set of training data coordinates relevant to each access point is computed, and its eigenvectors are determined. The major eigenvector (corresponding to the largest eigenvalue) gives the direction of maximum variance within the sample set, and this is used as the primary axis of the circumscribed rectangle. This gives a good approximation to the rectangle of minimum area that contains all the points. In other rectangular window embodiments, four coordinates in a local or global grid (e.g. geographical latitude and longitude coordinates) that define a rectangle aligned with the grid and fully encompassing the training data can be used.

Figure 3:
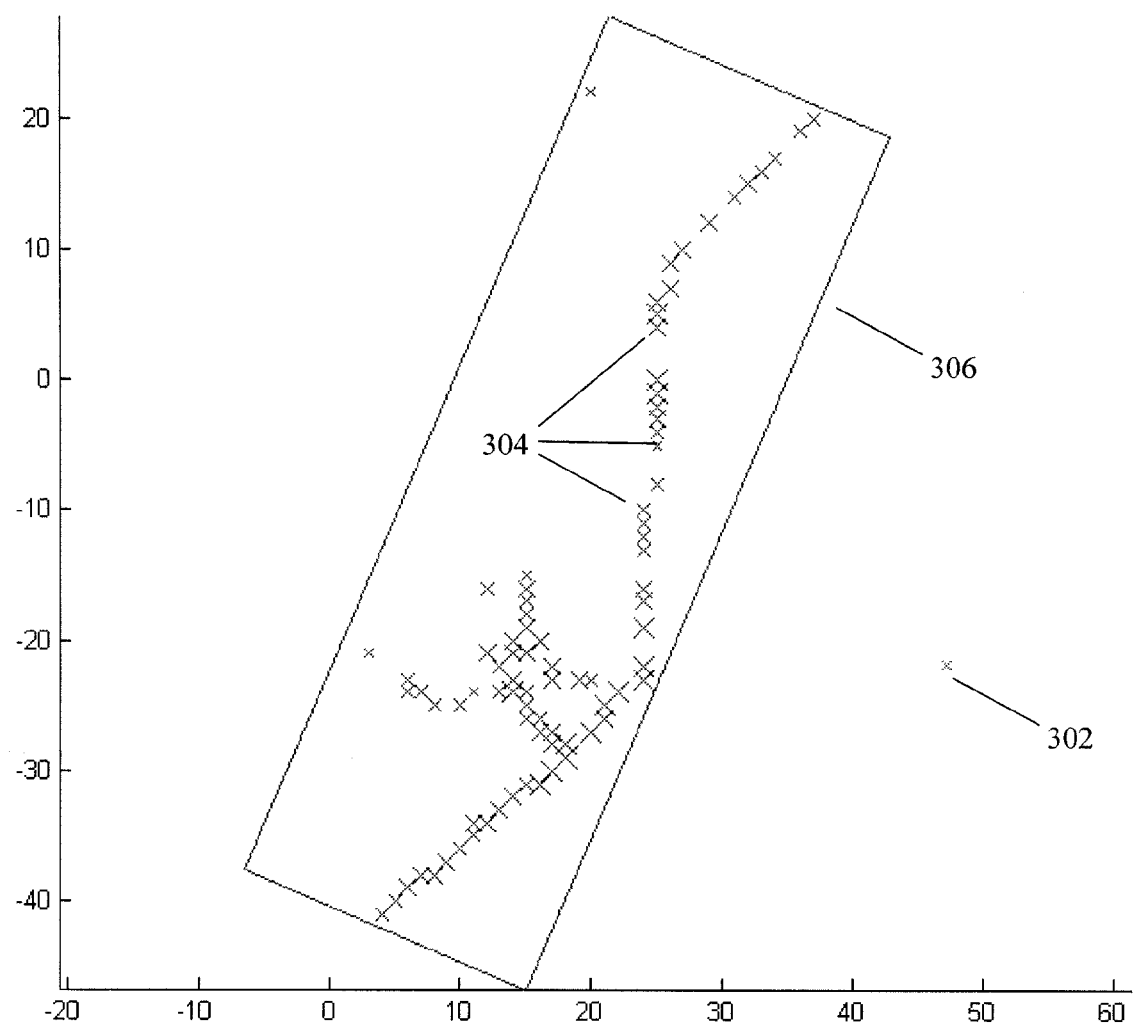
FIG. 3 is a diagram illustrating results for an example training set according to the invention.

FIG. 3 shows a typical example from a training data set in a location using the invention, where the cross mark 302 indicates the position p of the access point transmitter from the model and the crosses 304 show the positions at which the relevant training samples were recorded. A margin around the outside of the tightly fitting rectangle 306 may be included so that points just outside the training data range are not discounted when performing the position estimate, especially if there is not much training data. For example, the margin may be five meters. In other embodiments, the margin may be empirically determined.

Since the window of applicability represents the areas where an access point can be seen, in practice this may be best represented by multiple, disconnected windows rather than a single contiguous area. The method described covers this possibility.

Figure 4:
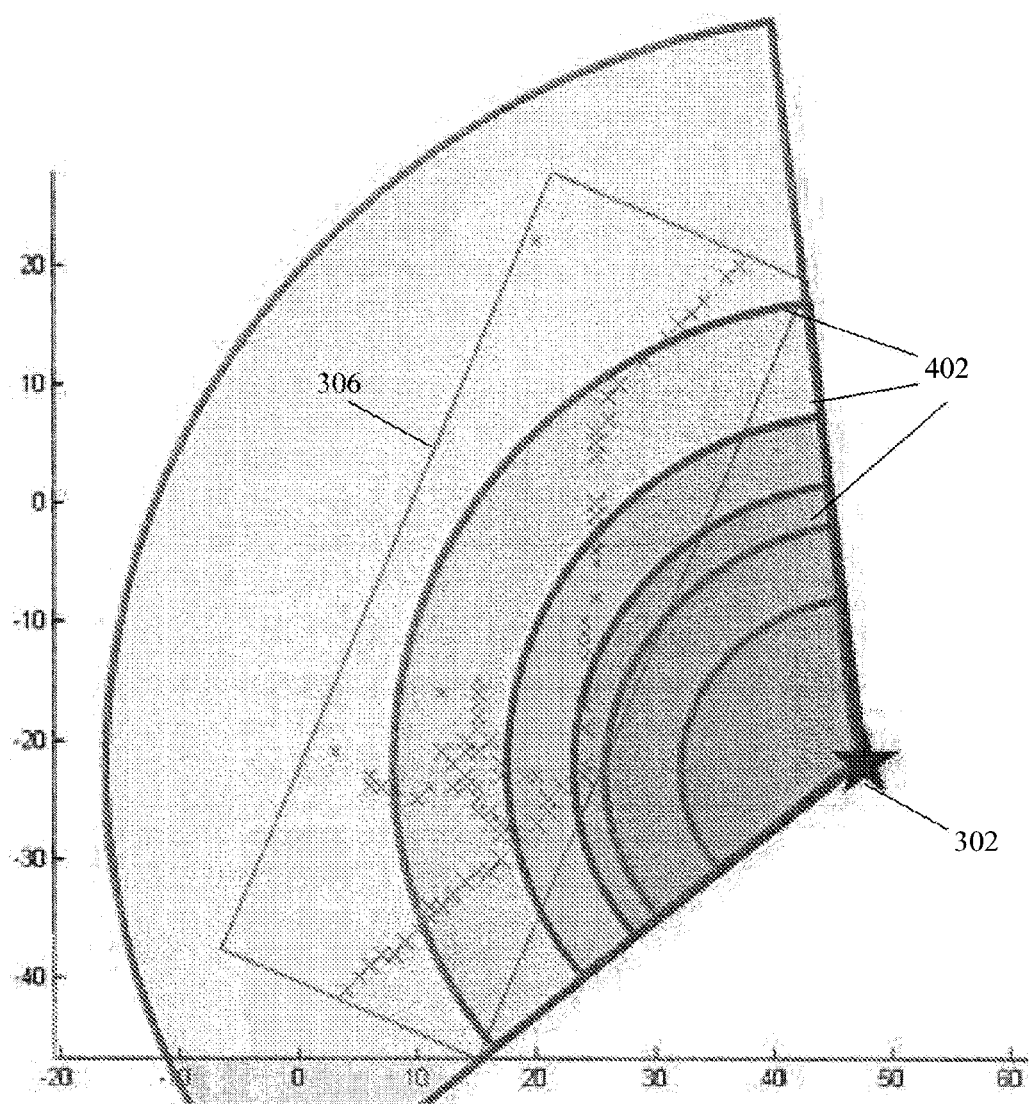
FIG. 4 is a diagram illustrating example power radii for an AP determined in accordance with embodiments of the invention.

In FIG. 4, the window 306 is shown along with the six power radii 402 such as those calculated as described above. Note that where no very high (or very low) signals are observed of one access point, one or more of the power radii need not necessarily intersect the window.

In embodiments, the confidence in the model derived above can be represented by two parameters. One is simply the number of data points used to create the model; the other is a population mask, which coarsely describes which areas of the applicability window had only a small amount of training data. Both measures can be used in embodiments of the positioning cost function to be described below. In other embodiments, other possible measures of confidence can be used. For instance, any combination of the following: the final value of the cost function; the number of training samples; the distribution of the training samples; the window shape and margin; the estimated accuracy of the training samples (both their RSSIs and their positions); the age of the training data; and the local environment (e.g. outdoor urban, indoor office, home, shopping mall, etc.).

The population mask (e.g. as determined in step S210) can be considered a heat map for the applicability window. In embodiments, it consists of a single bit value for each sub-rectangle in a 4×4 division of the original window. A value of 0 indicates that the number of training samples falling within that subsection is at least a threshold value and a value of 1 indicates the number of training samples within the subsection is below that threshold. When used for positioning, points that lie within a "1" area will incur extra cost, discouraging the final position from being in these areas.

Figure 5:
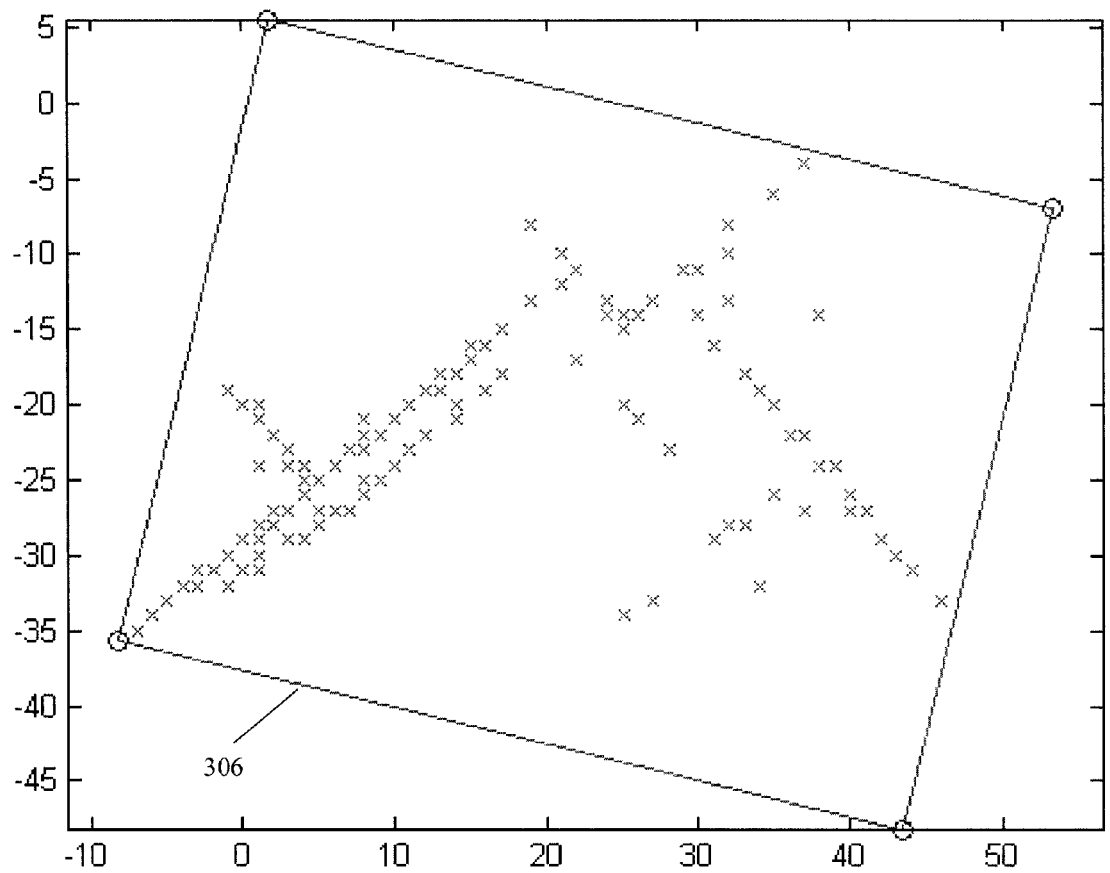
FIG. 5 illustrates an example window of applicability determined for an AP according to embodiments of the invention.
Figure 6:
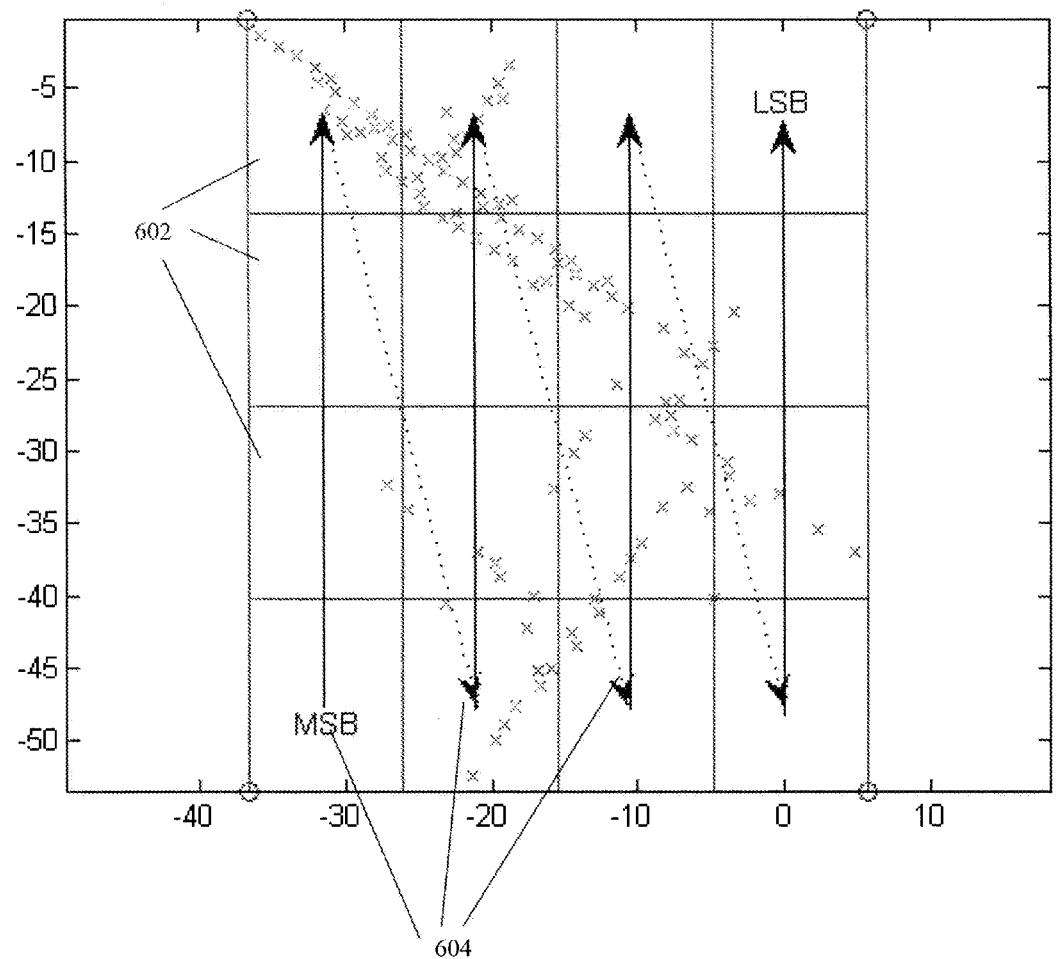
FIG. 6 illustrates an example population mask determined in accordance with embodiments of the invention.

FIG. 5 shows the training data and applicability window 306 for an example training set associated with another AP. FIG. 6 shows the same data after rotation, with its subdivisions 602 and the associated 4×4 mask. In one example embodiment of creating a population mask, the arrows 604 indicate the ordering of the bits in the 16-bit population mask. In this example, where a subsection 602 of the window is considered populated when it contains 5 or more samples, the population mask would be 1110 0000 0001 1011.

Example methods for performing positioning according to embodiments of the invention will now be described in more detail.

In the positioning phase, embodiments of the invention use the parametric model derived in the training phase to regenerate a set of expected fingerprints on the fly corresponding to the APs 104 whose signals 106 are received by the requesting device 102. One of a number of standard fingerprinting methods can then be applied to this set.

It should be noted that devices 102 used in the training phase need not be the same as devices 102 used in the positioning phase.

In practice, it is not necessary to derive explicitly the fingerprint set. Instead, in embodiments, the measured RSSI values for each received signal 106 can be fitted to the different AP propagation models by defining a cost function on how closely the two sets match at a given point. In embodiments, a conjugate gradient descent method is used to minimize this cost function, applying high cost outside each AP's region of applicability.

Embodiments of the invention are not limited to the actual density of the fingerprints collected in the original data but can use a continuum of generated fingerprints. For example, using standard fingerprinting methods, if the training data is not collected in a uniform fashion, spatially, i.e., if there are dense patches and sparse patches, then the final position fix can be drawn towards the denser areas, purely because random variation means that the measured data set is more likely to match closely with a fingerprint from that area. The parametric approach of QFP according to the invention does not suffer from this problem. That is, an advantage of this approach over basic fingerprinting is that a concentrated area of training data does not attract the final position estimate, so it is less important that the training data is evenly spread; preferably it still covers the whole area of interest, however.

An example quasi-fingerprinting positioning method according to embodiments of the invention will now be described in connection with the flowchart in FIG. 7.

Figure 7:
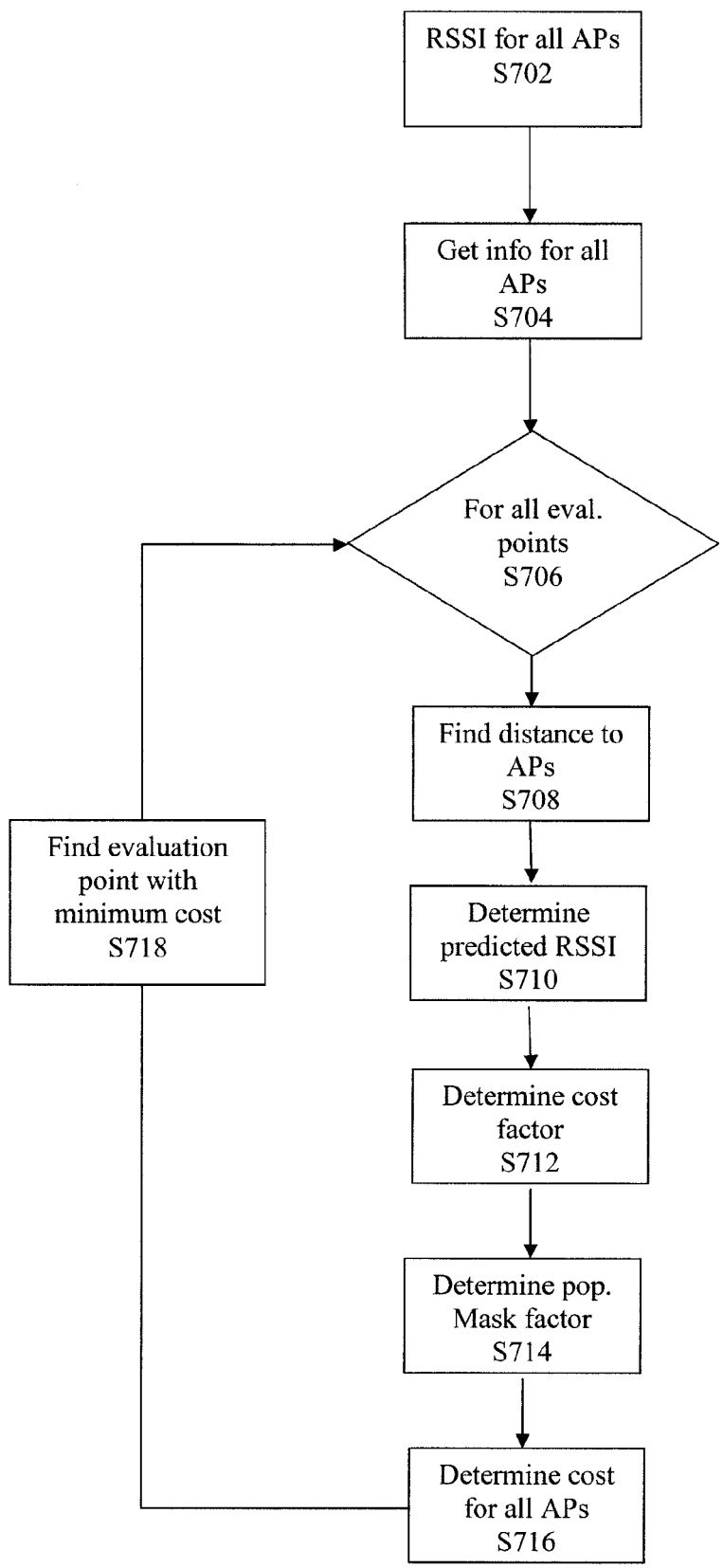
FIG. 7 is a flowchart illustrating an example positioning phase according to embodiments of the invention.

As shown in FIG. 7, in a first step S702, the device 102 obtains signal strength measurements from each signal 106 received from an associated AP 104. Although embodiments of the positioning phase can operate with just one observed AP 104, it is preferable to have several observed APs for better accuracy.

Next in step S704, the device 102 obtains from server 110 the QFP information for each AP 104 for which it has received a signal 106. This information includes the last computed centroid of the AP (e.g. using conventional or other weighted centroid positioning techniques), the window of applicability, the power radii, the number of measurements used to generate the model during the training phase, the AP transmitter position (i.e. estimated or nominal position) in the QFP model, and the population mask.

It should be noted that although step S704 is shown in this sequence for sake of illustration, it does not (and in practice probably will not) happen on a case by case basis in an actual implementation. In other more likely embodiments, server 110, periodically or upon request, provides the client 102 with all QFP data for the APs in its surrounding area, so that the client 102 could live off a single set of assistance data for some time. Those skilled in the art will appreciate that many alternatives and sequences for providing QFP data to clients are possible. In any event, it should be further appreciated that, according to aspects of the invention, the amount of QFP data that needs to be retained for each AP by a device 102 is relatively small, so that it is feasible for a device 102 to store QFP data for a large number of APs for a relatively long time.

Next, using the latest QFP information for the APs 104 for which it is receiving a signal, the device 102 computes its position. Example methods that can be used by device 102 in this step will now be described in more detail below.

As set forth above, embodiments of the invention use a cost function to compute position. One example cost function uses the difference between the expected and measured RSSIs for each access point observed by device 102. In embodiments, the basic cost function is very similar to that used in the training method, except that an extra cost is applied where the position estimate falls outside the window of applicability, or within a "1-region" of the population mask.

Accordingly, as shown in step S706, the cost function is evaluated at a plurality of evaluation points. The position at which the cost function attains a minimum is regarded as the best candidate for the position estimate. Alternatively, if the best k candidates are chosen, the final position estimate can be an average of these positions, weighted by the inverse of the cost (a k-nearest neighbour approach). An example of the contribution to the cost function from each access point measured is $$\text{Contribution} = (|RSSI_{meas} - RSSI_{pred}|^a \times (\text{sqrt}(n))^b) / (|RSSI_{meas}|^c)$$

where n is the number of samples used from the training set to create the model for the access point as reported by the server 110.

The values of a and c can be varied, but are preferably set to similar values to those used in the training cost function. The value of b reflects confidence in those models for which there is a large amount of training data. In one example, a=1, b=1 and c=2 for generating the final results.

The value of $RSSI_{meas}$ is the actual signal strength measured by the device 102 for the AP. The predicted signal strength $RSSI_{pred}$ above is derived from the distance between nominal AP position (i.e. from the QFP model) and the point at which the cost function is being evaluated, converted into an RSSI value by using the power radii associated with the AP.

Accordingly, in step S708, the method determines the distance d between the nominal position of each AP and the current evaluation point. Next, in step S710, the method determines the $RSSI_{pred}$ for each AP using the computed distance d and the power radii for the AP. In this step, the method interpolates between the power radii by using an exponential decay in the signal strength. For example, if the distance d between the centroid and evaluation point lies between the power radii $d_i$ and $d_{i+1}$ (having respective RSSIs of $RSSI_i$ and $RSSI_{i+i}$) a log function is fitted between the two radii to provide an equation for the intermediate values. Solving for the following equations:

$$-40 - RSSI_i = k \log_{10} d_i + c$$

$$-40 - RSSI_{i+1} = k \log_{10} d_{i+i} + c$$

Gives values for k and c as follows:

$$c = ((-40 - RSSI_i) \log_{10} d_{i+1} - (-40 - RSSI_{i+1}) \log_{10} d_i) / (\log_{10} d_{i+1} - \log_{10} d_i)$$

$$k = (-40 - RSSI_i - c) / \log_{10} d_i$$

Now, the signal strength associated with the distance d for each AP may be computed as:

$$RSSI_{pred} - 40 - k \log_{10} d - c$$

An addition to the method described here would be to use unseen access points in the cost function, applying a higher cost if the candidate position falls within the window of applicability of an access point not reported.

In embodiments, the contribution for each AP is multiplied by a factor, $\alpha$, where $\alpha := 1$ if $RSSI_{meas} \leq RSSI_{pred}$ and $\alpha := 2$ if $RSSI_{meas} > RSSI_{pred}$. Accordingly, as shown in step S712, the multiplication factor for each AP is computed using the determined $RSSI_{pred}$ and the measured RSSI $RSS_{Imeas}$ for each AP.

In a next step S714, a population mask multiplier for each AP for the current evaluation point is determined. In embodiments such as that described above in connection with FIG. 6, the population mask is divided into 16 subsections. The centre of each of these subsections is referred to as a subcentre. Each contribution for each AP to the cost function is subjected to a cost multiplier if and only if the evaluation position lies within a subsection the window of applicability that has a value of 1 in the access point's population mask. The multiplier's value, m, is given by $$m = 1 + (d_0 - d_1)/l$$

where $d_1$ is the distance from the evaluation point to the nearest subcentre (whose section must have a bit value of 1), $d_0$ is the distance from the evaluation point to the nearest subcentre with bit value of 0, and l is the average side length of a subsection.

Putting the components above together to form the cost function, results in the following formulation:

$$\text{cost} = \sum_{i=1}^{n} \frac{|RSSI_{i\,meas} - RSSI_{i\,predicted}| \cdot \sqrt{n_i} \cdot \alpha_i \cdot m_i}{|RSSI_{i\,meas}|^2}$$

where the cost is summed over all APs i. This cost function is determined in step S716.

In embodiments, an explicit, grid-based minimizer can be used in step S718 to minimize the above cost function for a given plurality of evaluation points. That is, an area close to the expected cost function minimum is gridded and the cost evaluated at each grid point. This process is repeated using a smaller grid centered on the grid point with minimum cost from the first stage. A more efficient minimizer is required for implementation and a conjugate gradient method can be used such as the Fletcher-Reeves Polak-Ribiere method, to obtain a solution (see Numerical Recipes in C, second edition, pp 420-425). Owing to local minima, an improvement in final position accuracy can be gained by using a grid-based minimizer and using a weighted average of the k(<10) best positions, but at a substantial computational cost. Other embodiments use a composite of these minimization methods, using the conjugate gradient method with different starting points, followed by a separate minimization on a small local grid. More generally, the positioning method applies the propagation models derived in the training phase to choose a final position estimate that provides a best fit to the test data.

Figure 8:
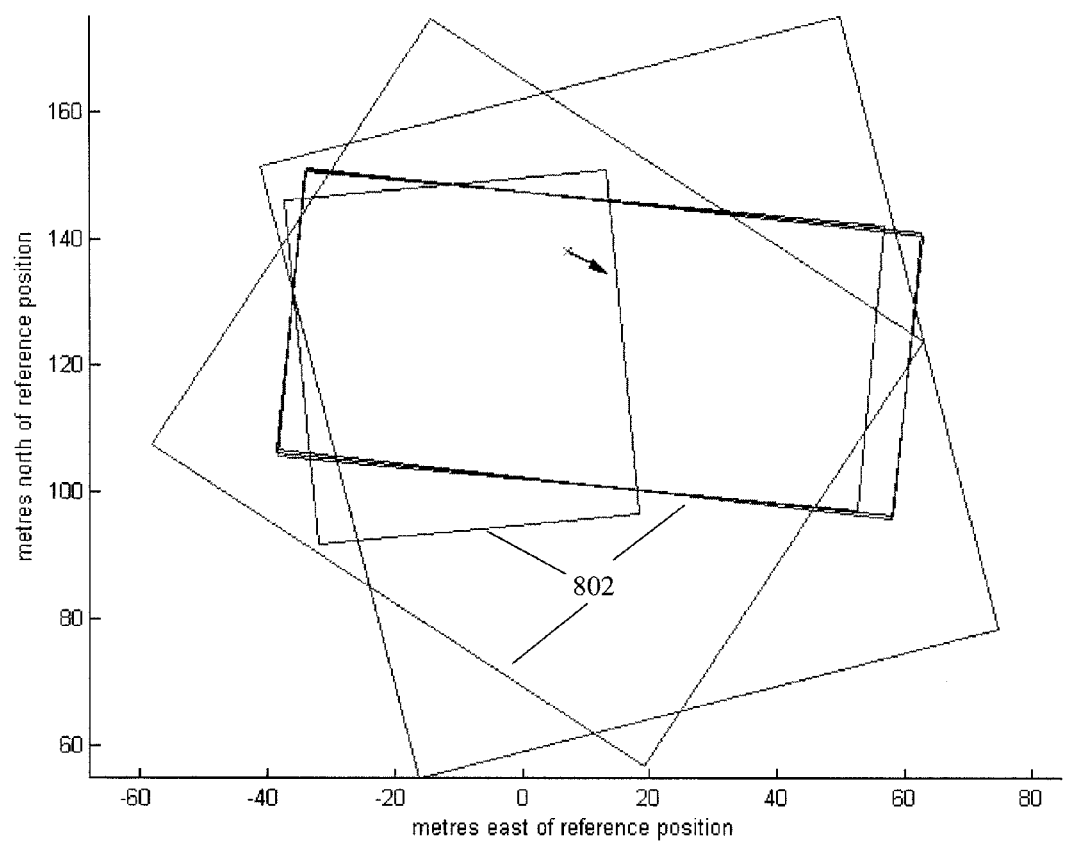
FIG. 8 is an example of a position determined using a quasi-fingerprinting from a plurality of APs in accordance with embodiments of the invention.

FIG. 8 shows a final position estimate 804 with the pertinent windows 802 associated with respective APs used in the position fix. The axes display meters from a reference position.

Additional or alternative embodiments include dealing with tile data when no QFP model is available but where centroid data is available. In this case, it is preferable to incorporate centroid information for any BSSIDs that are reported rather than discard the data, so the cost function expands to incorporate these extra measurements. The centroid data is transformed into a QFP model, using default values for some parameters, e.g., power radii and population mask. The transmitter position used is that of the centroid, and the applicability window is assumed to be infinite. The power radii values are derived from a TGN model. The value of n (=number of training samples/2) is derived from the length of the semi-major axis according to the following scheme:

| Semi-major axis length | QFP value of n |
|---|---|
| <5 m | 200 |
| Else <10 m | 50 |
| Else <20 m | 13 |
| Else | 3 |

In example embodiments, the default power radii are given by the following scheme:

| Received power (dBm) | Distance (m) |
|---|---|
| −50 | 3.1623 |
| −60 | 6.4333 |
| −70 | 9.7781 |
| −80 | 14.8618 |
| −90 | 22.5886 |
| −100 | 40 |

The population mask is [1, 1, . . . , 1] and the rotation matrix is $$\begin{bmatrix} 1 & 0 \\ 0 & 1 \end{bmatrix}$$

Every position is assumed to be within the applicability window for such a fingerprint.

The following results give centile accuracy figures derived from the same training and test data, for three different positioning methods: a conventional weighted centroid method, a conventional fingerprinting method and quasi-fingerprinting in accordance with embodiments of the invention. Note that further fine-tuning to the algorithms described above to improve their performance is still possible.

| Method | 50% | 67% | 95% | 99% |
|---|---|---|---|---|
| Weighted centroid | 10.81 m | 14.59 m | 20.73 m | 25.15 m |
| Histogram-based fingerprinting | 5.47 m | 7.67 m | 20.61 m | 33.91 m |
| Quasi-fingerprinting | 7.25 m | 10.39 m | 23.82 m | 27.35 m |

As shown above, the QFP method of the invention obtains 50 percentile accuracy within 7.25 meters, which is nearly as accurate as the 5.47 meters achieved with conventional fingerprinting. In general, the table above shows that the accuracy of the QFP method of the invention lies between that of fingerprinting and weighted centroid positioning. According to tests by the present inventors, errors in QFP positioning according to some embodiments generally lie about one-third between errors from the histogram method and the weighted centroid method.

It should be apparent that many alternative embodiments of the invention are possible, for example using different cost functions or propagation models. Those skilled in the art will appreciate how to implement such embodiments after being taught by the examples provided herein.

Moreover, although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   receiving measurement data for a wireless transmitter at a server; and
   producing, by the server, a quasi-fingerprint of the wireless transmitter using the received measurement data, the quasi-fingerprint comprising a window of applicability that circumscribes positions at which the measurement data was taken, the quasi-fingerprint further comprising a parametric representation that models received signal strength within the window of applicability,
   wherein the quasi-fingerprint consists essentially of a nominal position of the wireless transmitter, a set of signal power radii that respectively define positional contours at least partially around the nominal position of the wireless transmitter for a plurality of different signal strength values, and the window of applicability.

2. A method according to claim 1, wherein measurement data includes a signal strength value and a corresponding position associated with the wireless transmitter.

3. A method according to claim 1, wherein the measurement data includes a plurality of measurements, and wherein producing comprises:
   for each measurement in the measurement data, determining a cost based on an estimated position of the wireless transmitter;
   summing the costs for all the measurements;
   repeating the determining and summing for a plurality of values of the estimated position;
   determining a certain value of the estimated position that yields a minimum summed cost; and
   identifying the determined certain value as the nominal position.

4. A method according to claim 1, further comprising filtering the measurement data down to a plurality of measurements whose corresponding positions have a threshold amount of confidence and wherein producing comprises identifying a geographical boundary that encompasses all of the plurality of measurements as the window of applicability.

5. A method according to claim 4, wherein identifying the geographical boundary includes fitting a rectangle around the measurements.

6. A method according to claim 5, wherein the rectangle is aligned with a geographical grid.

7. A method according to claim 1, wherein the measurement data includes a plurality of measurements, each measurement comprising a signal strength value and a position, and wherein producing includes:
   identifying a predetermined signal power level;
   identifying all measurements having signal strength values corresponding to the predetermined signal power level;
   computing a radius value for the predetermined signal power level using the positions of the identified measurements;
   repeating the identifying and computing steps for a plurality of different predetermined signal power levels; and
   identifying the computed radii values as the set of signal power radii.

8. A method according to claim 1, wherein producing further includes computing a population mask associated with the window of applicability, the population mask defining measurement reliability weights at a plurality of different sub-windows within the window of applicability.

9. A method according to claim 1, further comprising:
   identifying a received signal from the wireless transmitter at a client device;
   receiving the quasi-fingerprint for the wireless transmitter; and
   computing an estimated position of the client device using the quasi-fingerprint.

10. A method according to claim 9, wherein computing the estimated position includes:
    identifying a measured signal strength value for the wireless transmitter at the client device;
    for each of a plurality of evaluation points, determining a cost associated with the wireless transmitter by comparing the measured signal strength value with a predicted signal strength value at that evaluation point;
    identifying a certain evaluation point that yields a minimum determined cost; and
    identifying the certain evaluation point as the estimated position.

11. A method comprising:
    receiving measurement data for a wireless transmitter at a server; and
    producing, by the server, a quasi-fingerprint of the wireless transmitter using the received measurement data, the quasi-fingerprint comprising a parametric representation that models received signal strength within a window of applicability,
    wherein the measurement data includes a plurality of measurements, and wherein producing comprises:
    for each measurement in the measurement data, determining a cost based on an estimated position of the wireless transmitter;
    summing the costs for all the measurements;
    repeating the determining and summing for a plurality of values of the estimated position; and
    determining a certain value of the estimated position that yields a minimum summed cost.

12. A method comprising:
    receiving measurement data for a wireless transmitter at a server; and
    producing, by the server, a quasi-fingerprint of the wireless transmitter using the received measurement data, the quasi-fingerprint comprising a window of applicability that circumscribes positions at which the measurement data was taken, the quasi-fingerprint further comprising a parametric representation that models received signal strength within the window of applicability,
    wherein the measurement data includes a plurality of measurements, each measurement comprising a signal strength value and a position, and wherein producing includes:
    identifying a predetermined signal power level;
    identifying all measurements having signal strength values corresponding to the predetermined signal power level; and
    computing a radius value for the predetermined signal power level using the positions of the identified measurements.

13. A method comprising:
    identifying a received signal from a wireless transmitter at a client device;
    receiving a quasi-fingerprint of the wireless transmitter, the quasi-fingerprint comprising a window of applicability that circumscribes positions at which measurement data for the wireless transmitter was taken, the quasi-fingerprint further comprising a parametric representation that models received signal strength within the window of applicability;

receiving a population mask associated with the window of applicability, the population mask defining measurement reliability weights at a plurality of different sub-windows within the window of applicability; and computing an estimated position of the client device using the quasi-fingerprint, wherein computing the estimated position includes using the population mask.

14. A method according to claim 13, wherein the quasi-fingerprint consists essentially of a nominal position of the wireless transmitter, a set of signal power radii that respectively define positional contours at least partially around the nominal position of the wireless transmitter for a plurality of different signal strength values, and the window of applicability.

15. A method according to claim 14, wherein computing the estimated position includes:

identifying a measured signal strength value for the wireless transmitter;

for each of a plurality of evaluation points, determining a cost associated with the wireless transmitter by comparing the measured signal strength value with a predicted signal strength value at that evaluation point;

identifying a certain evaluation point that yields a minimum determined cost; and identifying the certain evaluation point as the estimated position, wherein the predicted signal strength value is determined using the set of signal power radii.

16. A method according to claim 14, wherein computing the estimated position includes:

identifying a measured signal strength value for the wireless transmitter;

for each of a plurality of evaluation points, determining a cost associated with the wireless transmitter by comparing a measured distance from the nominal position with a predicted distance from the nominal position at that evaluation point;

identifying a certain evaluation point that yields a minimum determined cost; and identifying the certain evaluation point as the estimated position.

17. A method according to claim 13, wherein computing the estimated position includes:

identifying a measured signal strength value for the wireless transmitter;

for each of a plurality of evaluation points, determining a cost associated with the wireless transmitter by comparing the measured signal strength value with a predicted signal strength value at that evaluation point;

identifying a certain evaluation point that yields a minimum determined cost; and identifying the certain evaluation point as the estimated position.

18. A method according to claim 17, wherein determining the cost includes determining a weight using the window of applicability.

* * * * *

UNITED STATES PATENT AND TRADEMARK OFFICE
CERTIFICATE OF CORRECTION

PATENT NO. : 8,838,151 B2
APPLICATION NO. : 13/436795
DATED : September 16, 2014
INVENTOR(S) : Tarlow et al.

Page 1 of 1

It is certified that error appears in the above-identified patent and that said Letters Patent is hereby corrected as shown below:

In the Specification,

In Column 10, Line 58, delete "$RSSI_{pred}\ 40\ k\ \log_{10}\ d\ c$" and insert -- $RSSI_{pred} = -40 - k\ \log_{10} d - c$ --, therefor.

In Column 10, Line 48, delete "$-40-RSSI_{i+1} = k\ \log_{10}\ d_{i+i}+c$" and insert -- $-40 - RSSI_{i+1} = k\ \log_{10} d_{i+1} + c$ --, therefor.

In Column 6, Line 44, delete "$Cost=(\Sigma\alpha_i|RSSI_i-f(\oplus p_i-p|))/(|RSSI_i|^k)$" and insert -- $Cost = (\Sigma\ \alpha_i\ |\ RSSI_i - f(|\mathbf{p}_i - \mathbf{p}|)\ |\ ) / (|\ RSSI_i\ |^k)$ --, therefor.

In Column 10, Line 67, delete "RSSI RSSImeas" and insert -- RSSImeas --, therefor.

Signed and Sealed this
Seventeenth Day of February, 2015

Michelle K. Lee
*Deputy Director of the United States Patent and Trademark Office*